(No Model.)

G. W. N. YOST.
TYPE WRITER.

No. 285,096. Patented Sept. 18, 1883.

Witnesses:
W. R. Masson
N. E. Bowen

Inventor
George W. N. Yost
by E. E. Masson
atty.

United States Patent Office.

GEORGE W. N. YOST, OF NEW YORK, N. Y., ASSIGNOR TO THE AMERICAN WRITING MACHINE COMPANY, OF NEW YORK.

TYPE-WRITER.

SPECIFICATION forming part of Letters Patent No. 285,096, dated September 18, 1883.

Application filed January 17, 1881. (No model.)

*To all whom it may concern:*

Be it known that I, GEORGE W. N. YOST, of New York city, in the State of New York, have invented a new and useful Improvement in Type-Writing Machines, of which the following is a specification.

My invention relates to improvements in type-writing machines in which a series of pivoted type-levers are operated by means of finger-keys in connection with key-levers and connecting-rods.

The objects of my improvement are to unite each finger-key to its key-lever by simple means, and at the same time to retain permanently their relative position after they are once united.

Heretofore finger-keys have been constructed with a strap to pass directly around the key-lever or a portion thereof. Others have been made with a rectangular stem mortised in its lower end, so as to straddle the key-lever, with a pin driven transversely to keep them united. Finger-keys thus constructed had no guide to retain them vertically; but in many machines as now constructed guides are necessary, as long stem-keys are used. In such machines the upper part of the strap or clasp secured upon the key-lever has been perforated vertically, and its interior screw-tapped, to receive the lower end of the stem of the finger-key upon which a screw-thread has been cut. One objection to this mode of fastening is that the finger-keys are liable to turn accidentally or gradually within their support, and the letters or indices upon their face become out of line or inclined at various angles.

The objects of my invention are to remedy this defect by the mechanism illustrated in the accompanying drawings, in which—

Figure 1:
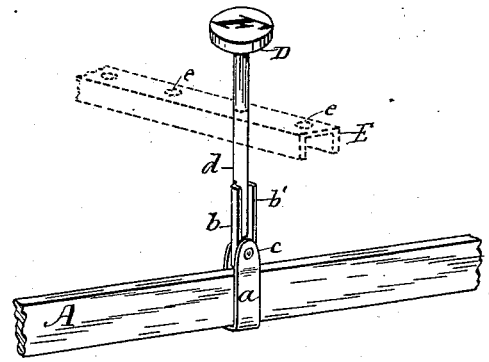
Figure 2:
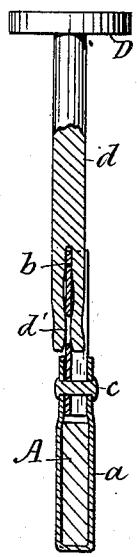
Figure 3:
Figure 4:
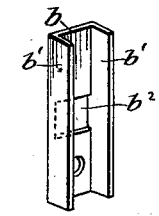

Figure 1 represents in perspective a type-writer finger-key having its stem united to the key-lever thereof. Fig. 2 represents the same in vertical section, but upon a larger scale. Fig. 3 is a rear view of the finger-key.
Fig. 4 represents in perspective the connecting-link used to unite the finger-key to the key-lever strap.

In the drawings, A represents a type-writer key-lever, generally made of a strip of wood.
Around said key-lever is sprung a strap, $a$, of sheet metal, in the usual manner. To this strap is pivoted a rectangular link, $b$, by means of a rivet, $c$, passing through the ends of the strap. This link $b$ is made of thin sheet metal, having its vertical edges $b'$ flanged or turned at right angle to its central portion, the width of the flanged edges $b'$ being such as to fit between the upper ends of the strap $a$, and its central portion is of such size as to easily receive the stem $d$ of the finger-key D. This stem $d$ is preferably cylindrical, and has its lower end split lengthwise to form two branches, that are slightly sprung together at $d'$, adjacent to their ends, to make a firm engagement with the opening $b^2$ in the link $b$ and prevent the parts becoming accidentally disconnected after having been placed together in position.

The type-writing machines upon which these stem finger-keys are used are generally provided with six parallel bars, E, secured to the sides of the frame, each having a series of perforations, $e$, to act as guides and side supports for the finger-keys. The space between the key-levers and guide-bars E is generally too small for the passage of the constructer's fingers to drive a pin or rivet; hence the finger-key has to be secured to its key-lever by passing it through one of the small guide-perforations $e$. This I accomplish in an instant by simply pushing the finger-key stem over and astride of the upper end of the connecting-link until its sprung branches enter the opening $b^2$ therein, the flanges $b'$ acting as a double protection against the displacement of the finger-key.

Having now fully described my invention, I claim—

1. A type-writer finger-key having for its stem a cylindrical rod with its lower end split lengthwise and sprung to form spring-jaws, substantially as and for the purpose described.

2. The combination of a type-writer key-lever, a strap around said lever, the stem of a finger-key split lengthwise in its lower end, and a connecting-link entering said split stem, substantially as and for the purpose described.

3. The combination of a type-writer key-lever, a strap secured to said lever, the stem of a finger-key having its lower end split lengthwise, and a connecting-link provided with side flanges, substantially as and for the purpose described.

4. The combination of a type-writer key-lever, a strap secured thereto, and the stem of a finger-key having its lower end split lengthwise and sprung upon a connecting-link, substantially as and for the purpose described.

5. The combination of a type-writer key-lever, a strap secured thereto, the stem of a finger-key having its lower end forked to form a spring-clasp, and a connecting-link having flanged sides and a perforation for engagement with the stem of said finger-key, substantially as and for the purpose described.

GEORGE W. N. YOST.

Witnesses:
E. E. MASSON,
W. B. MASSON.